(12) United States Patent
Boardman, IV et al.

(10) Patent No.: US 7,923,890 B2
(45) Date of Patent: Apr. 12, 2011

(54) APPARATUS FOR GENERATOR STATOR MOUNTING

(75) Inventors: William Hunter Boardman, IV, Burnt Hills, NY (US); Richard Nils Dawson, Voorheesville, NY (US); Anand Shankar Tanavde, Slingerlands, NY (US)

(73) Assignee: General Electric Company, Schenectady, NY (US)

( * ) Notice: Subject to any disclaimer, the term of this patent is extended or adjusted under 35 U.S.C. 154(b) by 38 days.

(21) Appl. No.: 12/468,629

(22) Filed: May 19, 2009

(65) Prior Publication Data
US 2010/0295407 A1 Nov. 25, 2010

(51) Int. Cl.
*H02K 5/04* (2006.01)
(52) U.S. Cl. ................. 310/216.129; 310/431
(58) Field of Classification Search ............ 310/51, 310/418, 419, 422, 431, 433, 216.007, 216.008, 310/216.009, 216.049, 216.051, 216.055, 310/216.086, 216.113, 216.129, 216.131, 310/216.135
See application file for complete search history.

(56) References Cited

U.S. PATENT DOCUMENTS

| | | | | |
|---|---|---|---|---|
| 2,424,299 A | * | 7/1947 | Baudry et al. | 310/431 |
| 2,489,109 A | * | 11/1949 | Shildneck et al. | 310/431 |
| 2,554,226 A | * | 5/1951 | Taylor | 310/431 |
| 2,632,861 A | * | 3/1953 | Morton et al. | 310/431 |
| 4,425,523 A | | 1/1984 | Detinko et al. | |
| 4,469,973 A | * | 9/1984 | Guyot et al. | 310/433 |
| 4,634,909 A | * | 1/1987 | Brem | 310/91 |
| 4,891,540 A | | 1/1990 | Cooper et al. | |
| 5,023,501 A | * | 6/1991 | Zimmermann | 310/432 |
| 5,767,602 A | * | 6/1998 | Sargeant | 310/432 |
| 5,875,540 A | | 3/1999 | Sargeant et al. | |
| 6,346,760 B1 | | 2/2002 | Boardman, IV | |
| 7,202,587 B2 | | 4/2007 | Sargeant et al. | |

FOREIGN PATENT DOCUMENTS

EP 1835596 A2 9/2007
JP 56101344 A 8/1981

OTHER PUBLICATIONS

GB 1007931.7, Search Report and Written Opinion, Sep. 13, 2010.

* cited by examiner

*Primary Examiner* — Dang D Le
(74) *Attorney, Agent, or Firm* — Fletcher Yoder

(57) ABSTRACT

In one embodiment, a system includes a generator frame that includes a spring ring configured to mount removably between an outer annular support and a stator. The spring ring includes a first guide configured to circumferentially align the spring ring to the outer annular support, and a second guide configured to circumferentially align the spring ring to the stator.

20 Claims, 7 Drawing Sheets

APPARATUS FOR GENERATOR STATOR MOUNTING

BACKGROUND OF THE INVENTION

The subject matter disclosed herein relates to a generator, and more specifically, to a system for mounting a stator in a generator.

Generators typically employ a combination of a rotor and a stator to convert rotational energy into electrical energy. The stator generally includes multiple laminated core segments stacked within an annular frame. In certain generator designs, multiple circumferentially spaced keybars are aligned with the longitudinal axis of the annular frame and welded to a vibration isolation system that is secured to the annular frame. Dovetails within the keybars align with corresponding notches around the circumference of the core segments to secure the stator to the annular frame. Unfortunately, welding these keybars in place results in weld distortion, which increases the difficulty of maintaining proper keybar alignment. The keybar dovetails may be machined after the keybars are welded in place, but this type of machining is costly and limited to a few milling machines in the world because of the large size associated with certain generators.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a generator that includes a rotor, a stator disposed about the rotor, and a framework disposed about the stator. The framework includes an outer annular support, an outer axial bar coupled to the outer annular support, and an inner axial bar coupled to the stator. The framework also includes a spring ring disposed radially between the outer axial bar and the inner axial bar. The spring ring is removably coupled to the outer axial bar via a first guide configured to align the spring ring to the outer annular support, and the spring ring is removably coupled to the inner axial bar via a second guide configured to align the inner axial bar with the stator.

In a second embodiment, a system includes a generator frame that includes a spring ring configured to mount removably between an outer annular support and a stator. The spring ring includes a first guide configured to circumferentially align the spring ring to the outer annular support, and a second guide configured to circumferentially align the spring ring to the stator.

In a third embodiment, a system includes a rotary machine that includes an annular frame, a stator disposed within the annular frame, and a rotor disposed radially inward from the stator and configured to rotate about a longitudinal axis of the annular frame. The rotary machine also includes a stator mounting system that includes multiple circumferentially spaced spring bars extending axially through the annular frame and secured to the annular frame. The stator mounting system also includes multiple annular spring rings disposed within the annular frame and secured to the spring bars by multiple U-bolt clamps, and multiple keybars disposed adjacent to machined recesses within the annular spring rings. The machined recesses are configured to secure the keybars in a circumferential direction.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
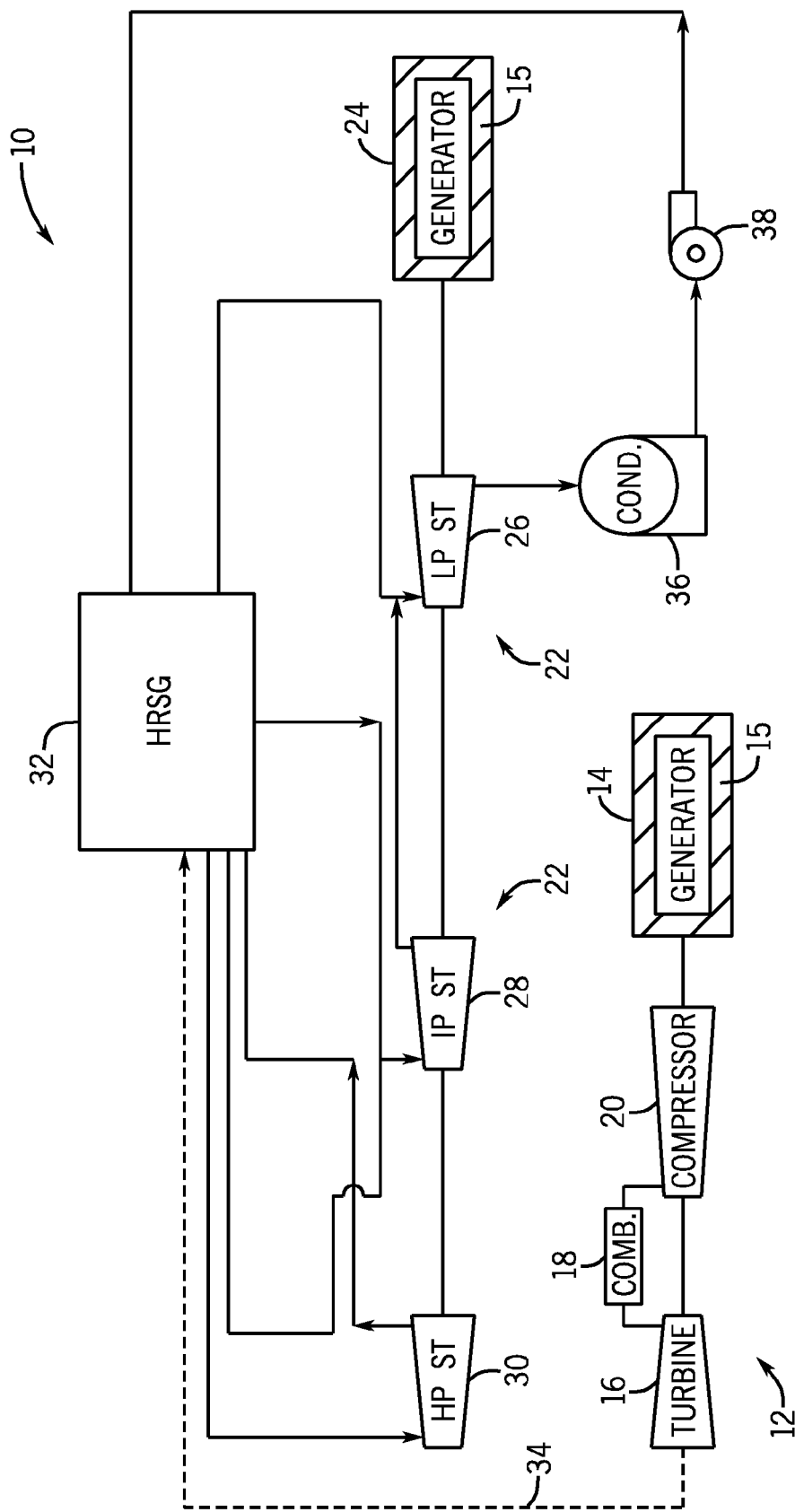
FIG. 1 is a schematic flow diagram of an embodiment of a combined cycle power generation system having a gas turbine, a steam turbine, an HRSG, and generators that include frames configured to reduce machining costs in accordance with certain embodiments of the present technique.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure may reduce the cost and cycle time associated with generator production by obviating fabrication complexity and rework associated with correcting weld distortion, machining entire generator frames to mount bolted core suspension assemblies, and/or machining keybar dovetails after the keybars have been secured to the frame. Furthermore, embodiments may facilitate a more compact vibration isolation system, thereby allowing a larger stator to fit within an annular frame of a given diameter. Certain embodiments may include multiple section plates extending radially inward from an annular frame. These section plates may be spaced along the longitudinal axis of the annular frame and include circumferentially spaced openings for axially oriented spring bars. Multiple annular spring rings disposed within the annular frame may be secured to the spring bars by multiple U-bolt clamps. These spring rings may include multiple machined recesses on a radially inward surface to align keybars in an axial direction and secure the keybars in a circumferential direction. Because these machined recesses may be precisely located about the circumference of the spring ring, the recesses may ensure proper circumferential alignment of the keybars relative to notches within a stator. Therefore, the keybars may be machined prior to attachment, thereby significantly reducing construction costs. Keybars may be radially aligned by inserting a radial alignment shim between the machined recess and the keybar and/or inserting a spring ring shim between the spring bar and the spring ring. Certain embodiments may include a keybar mounting pad disposed between the keybar and the machined recess. The keybar mounting pad may be welded to the keybar and disposed within the machined recess to block circumferential movement of the keybar.

FIG. 1 is a schematic flow diagram of an embodiment of a combined cycle power generation system 10 having a gas turbine, a steam turbine, and a heat recovery steam generator (HRSG). The system 10 is described below for the purpose of providing context for embodiments of unique generator configurations that may reduce frame construction costs. It should be appreciated that the generator embodiments described below may be incorporated into other power generation systems. The system 10 may include a gas turbine 12 for driving a first generator 14 for producing electrical power. In the present embodiment, generator 14 includes a vibration isolation system 15 configured to mount a stator to an annular frame of the generator 14, while absorbing vibrations. The vibration isolation system 15 may include certain features configured to decrease construction costs associated with generator assembly by reducing post-assembly machining operations. The gas turbine 12 may include a turbine 16, a combustor or combustion chamber 18, and a compressor 20. The system 10 may also include a steam turbine 22 for driving a second generator 24. The second generator 24 may also include a vibration isolation system 15 configured to reduce generator assembly costs. In addition, although the gas turbine 12 and steam turbine 22 may drive separate generators 14 and 24, as shown in the illustrated embodiment, the gas turbine 12 and steam turbine 22 may also be utilized in tandem to drive a single load via a single shaft. In the illustrated embodiment, the steam turbine 22 may include one low-pressure section 26 (LP ST), one intermediate-pressure section 28 (IP ST), and one high-pressure section 30 (HP ST). However, the specific configuration of the steam turbine 22, as well as the gas turbine 12, may be implementation-specific and may include any combination of sections.

The system 10 may also include a multi-stage HRSG 32. The illustrated HRSG 32 is shown to convey the general operation of such HRSG systems. Heated exhaust gas 34 from the gas turbine 12 may be transported into the HRSG 32 and used to heat steam used to power the steam turbine 22. Exhaust from the low-pressure section 26 of the steam turbine 22 may be directed into a condenser 36. Condensate from the condenser 36 may, in turn, be directed into a low-pressure section of the HRSG 32 with the aid of a condensate pump 38.

Figure 2:
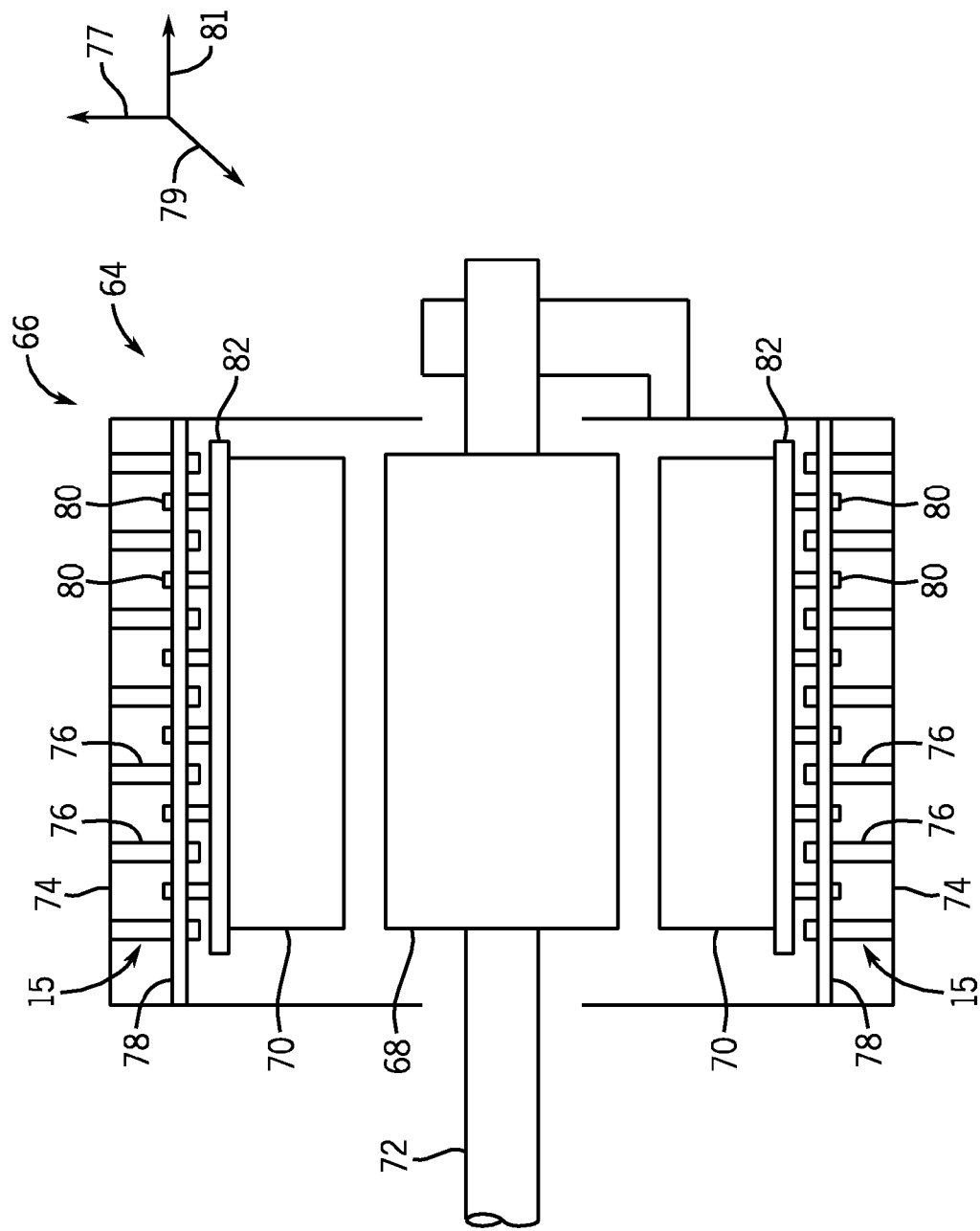
FIG. 2 is a cross-sectional side view of a generator, as shown in FIG. 1, in accordance with certain embodiments of the present technique.

FIG. 2 is a cross-sectional side view of a generator 64 that may serve as the generator 14 and/or generator 24 in the combined cycle power generation system 10, or various other power generation systems. The generator 64 includes an annular frame 66, a rotor 68, a stator 70 and a shaft 72. The shaft 72 may be driven to rotate about a rotational axis by a gas turbine 12, a steam turbine 22, a wind turbine, a hydro turbine, an internal combustion engine, or any other suitable device configured to provide a rotational output. The shaft 72 is coupled to a substantially cylindrical rotor 68 that may include a wire winding about a magnetic core. The rotor 68 is disposed within a stator 70 configured to provide a stationary magnetic field. As appreciated, rotation of the rotor 68 within the stator 70 may generate electrical current within the wire winding, thereby producing an electrical output from the generator 64.

The stator 70 is supported within a casing 74 of the annular frame 66 by the vibration isolation system, stator mounting system or framework 15 which includes outer annular supports or ring-shaped section plates 76, outer axial bars or spring bars 78, spring ring assemblies 80, and inner axial bars or keybars 82. As discussed in detail below, the stator 70 may include multiple laminated core segments, each having circumferentially spaced notches. Each notch may be configured to interlock with a dovetail portion of each keybar 82, securing the core segments to the keybars 82. The keybars 82 may be equally spaced about the circumference of the annular frame 66 at locations corresponding to the stator notches. The keybars 82 may be secured to spring bars 78 via spring ring assemblies 80. As discussed in detail below, the spring ring assemblies 80 may include spring rings, spring ring to keybar connectors and spring ring to spring bar connectors. The spring bars 78 pass through axial openings (i.e., holes) in the section plates 76 to secure the stator support components to the annular frame 66. This configuration may serve to dampen vibrations within generator 64. Specifically, vibrations from the stator 70 are transmitted to spring bars 78 via keybars 82 and spring ring assemblies 80. As illustrated, the spring ring assemblies 80 are connected to the spring bars 78 at the approximate midpoint between section plates 76. In this configuration, the spring bars 78 may flex in a radial direction 77 and/or a circumferential direction 79, thereby dissipating vibrational energy. Furthermore, as discussed in detail below, the spring ring assemblies 80 may include features that reduce the cost of generator production by aligning the keybars 82 relative to the stator 70 such that keybar dovetails may be machined prior to securing the keybars 82 to the annular frame 66.

Figure 3:
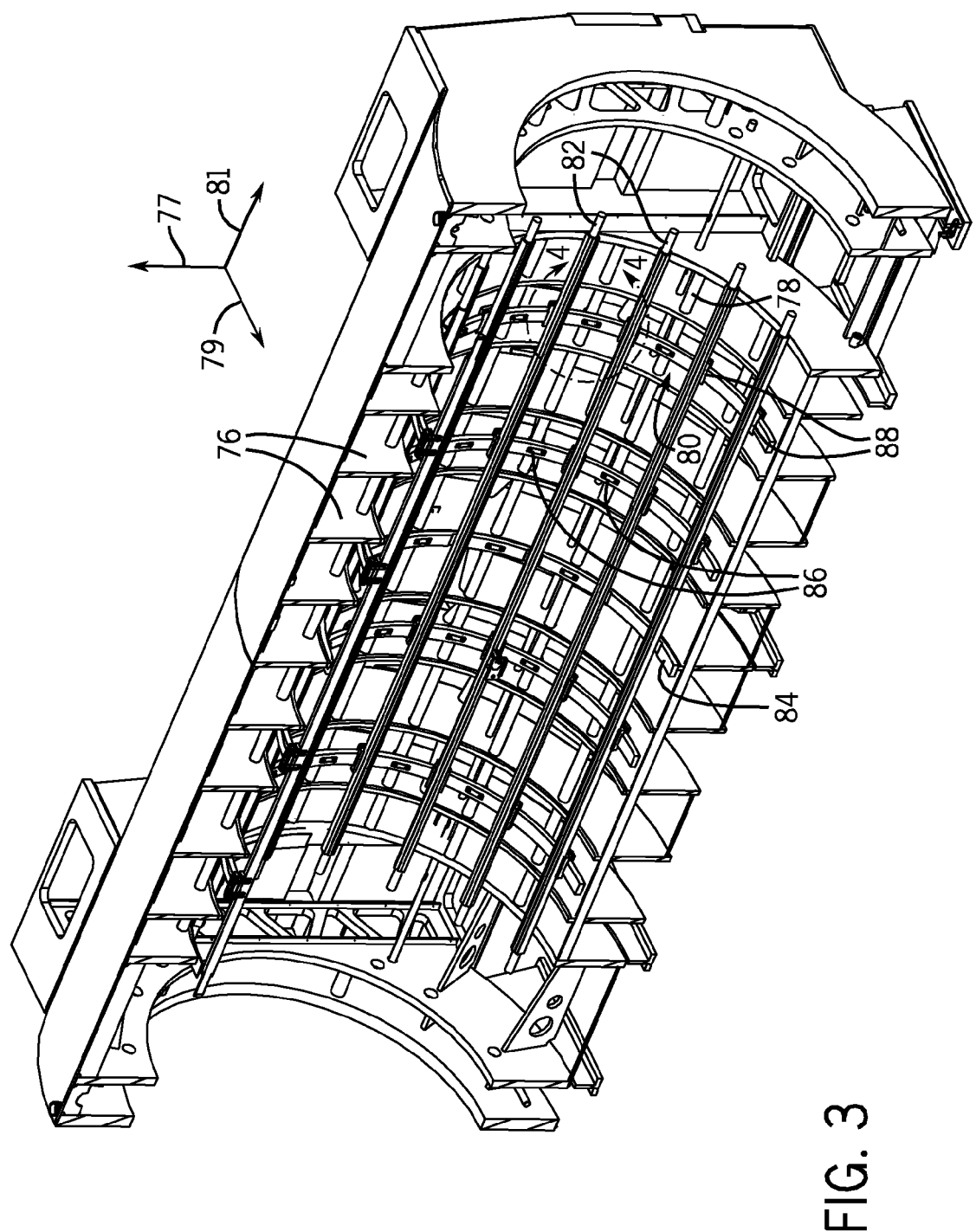
FIG. 3 is a cutaway perspective view of a generator frame that may be used in the generator of FIG. 2 in accordance with certain embodiments of the present technique.

FIG. 3 is a cutaway perspective view of a generator frame 66 that may be used in the generator 64 of FIG. 2. As previously discussed, the frame 66 includes annular section plates 76 (e.g., hollow disk-shaped plates or rings) substantially equally spaced in the axial direction 81 along the length of the frame 66 and extending radially inward. As illustrated, the frame 66 includes nine section plates 76. In alternative configurations, the frame 66 may include more or fewer section plates 76, such as 3, 5, 7, 10, 15, 20, or more section plates 76, for example. The spring bars 78 are oriented in the axial direction 81 and spaced about the circumference of the section plates 76. Specifically, ten spring bars 78 pass through holes in the section plates 76. In alternative embodiments, more or fewer spring bars 78 may be employed. For example, 4, 6, 8, 10, 12, 14, 16, 18, 20, 22, or more spring bars 78 may pass through holes in the section plates 76. In certain embodiments, the spring bars 78 may be fastened (e.g., welded, bolted, bonded, etc.) to the section plates 76 at the intersection between the spring bars 78 and the holes to secure the spring bars 78 to the section plates 76.

The spring bars 78 are coupled to the keybars 82 by spring ring assemblies 80. Each spring ring assembly 80 includes a spring ring 84, multiple spring bar to spring ring connectors 86, and multiple spring ring to keybar connectors 88. The number of spring ring assemblies 80 may be the same as or similar to the number of section plates 76. For example, one spring ring assembly 80 may be coupled to the spring bars 78 between each section plate 76. This configuration may dampen vibrations between the stator 70 and the annular frame 66 due to compliance of the spring bars 78. In other words, the spring bars 78 may flex in the radial direction 77 and/or the circumferential direction 79, thereby dissipating vibrational energy. Alternative embodiments may include multiple (e.g., 2, 3, 4, 5, 6, 7, or more) spring ring assemblies 80 between each section plate 76, or one spring ring assembly 80 per multiple (e.g., 2, 3, 4, 5, or more) section plates 76. As illustrated, the spring bars 78 are disposed on an outward radial surface of the spring rings 84, while the keybars 82 are disposed on an inner radial surface. Spring bar to spring ring connectors 86 may serve to couple each spring bar 78 to each spring ring 84. Similarly, spring ring to keybar connectors 88 may couple each keybar 82 to each spring ring 84. In the present embodiment, 15 keybars 82 are substantially equally spaced about the circumference of the annual frame 66. Alternative embodiments may include more or fewer keybars 82, such as 5, 10, 20, 25, 30, 35 or more keybars 82. As discussed in detail below, the spring rings 84 and/or the spring ring to keybar connectors 88 may include certain features configured to properly align the keybars 82 relative to the stator 70 such that keybar dovetails may be machined prior to keybar installation, thereby reducing frame construction costs.

Figure 4:
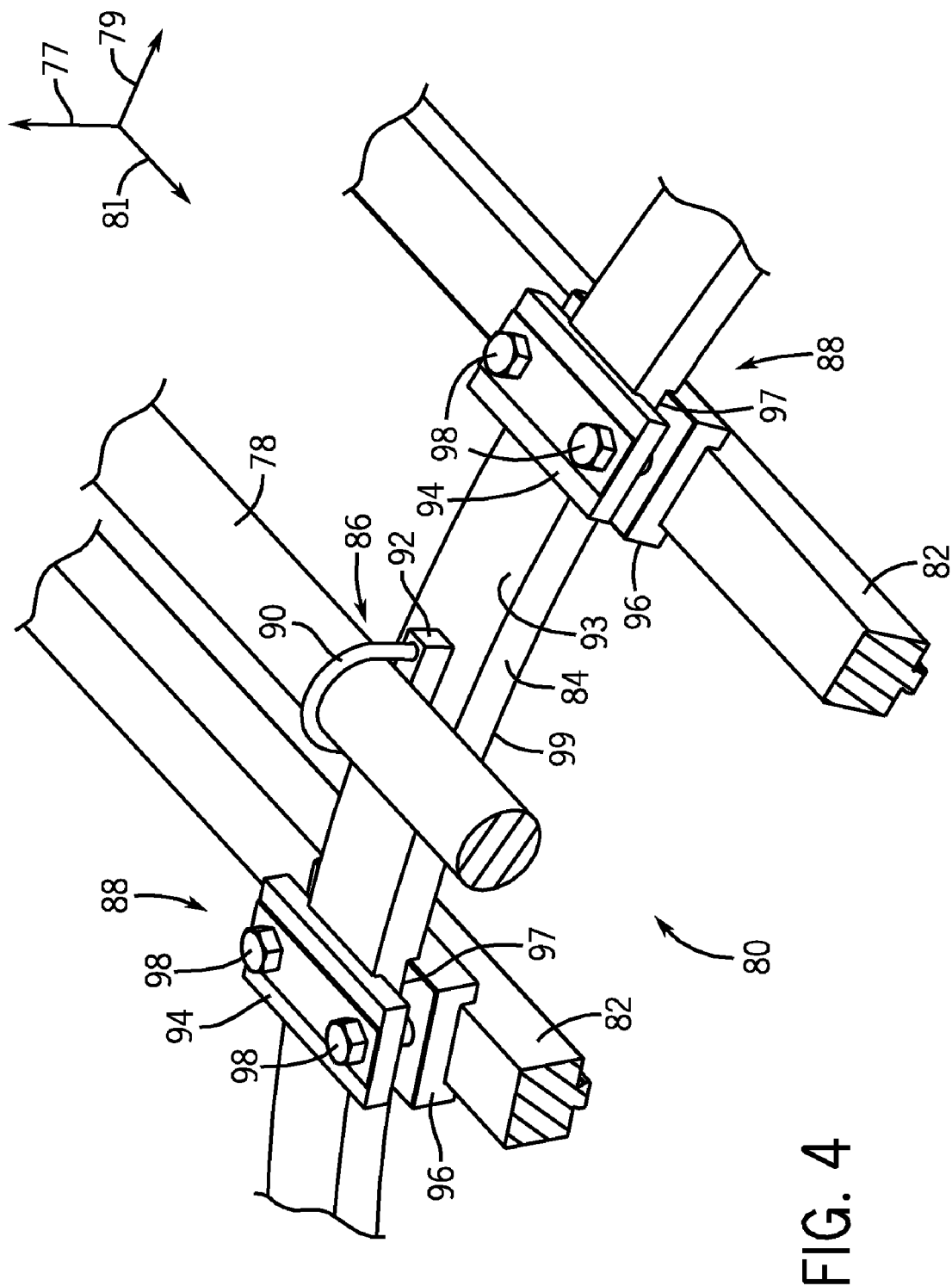
FIG. 4 is a detailed perspective view of a spring bar, spring ring, and keybar, as taken within line 4-4 of FIG. 3, in accordance with certain embodiments of the present technique.

FIG. 4 is a detailed perspective view of the spring ring assembly 80 disposed between a spring bar 78 and keybars 82, as taken within line 4-4 of FIG. 3. As illustrated, the spring bar to spring ring connector 86 (e.g., removable clamp) includes a U-bolt clamp 90 and a clamp plate 92 disposed on a radially outward surface 93 of the spring ring 84. As discussed in detail below, the spring ring 84 may include a first guide configured to align the spring ring 84 to the annular frame 66. Specifically, the clamp plate 92 and the spring ring 84 may include radial fastener receptacles (i.e., bolt holes or radial openings) which may be aligned prior to insertion of the U-bolt clamp 90. After alignment, the clamp plate 92 may be disposed adjacent to the spring bar 78. The U-bolt clamp 90 may then be disposed about the spring bar 78 such that the ends of the U-bolt clamp 90 pass through the bolt holes in the clamp plate 92 and the spring ring 84. In certain embodiments, the ends of the U-bolt clamp 90 are threaded. In such embodiments, nuts may be secured to the ends, thereby coupling the spring bar 78 to the spring ring 84. Further embodiments may employ other fastener configurations to secure the spring bar 78 to the spring ring 84. By precisely positioning the first guide (e.g., bolt holes in the spring ring 84), the spring ring 84 may be circumferentially aligned within the annular frame 66 such that the keybar dovetails align with the stator notches. In addition, this configuration may reduce the construction costs associated with frame assembly by employing relatively inexpensive U-bolt clamps 90 rather than expensive welded connections.

FIG. 4 also illustrates the spring ring to keybar connectors 88 (e.g., removable clamp), which include a spring ring clamp plate 94, a mounting pad 96, and a pair of fasteners or bolts 98. The spring ring clamp plate 94 is disposed on an outer radial surface 93 of the spring ring 84, while the mounting pad 96 is disposed on an inner radial surface 99. This configuration sandwiches the spring ring 84 between the spring ring clamp plate 94 and the mounting pad 96. The bolts 98 extend along the radial direction 77 through radial fastener receptacles (i.e., holes) in opposite axial ends of the spring ring clamp plate 94 and the mounting pad 96. In the present configuration, the bolts 98 are axially offset from the spring ring 84 such that the bolts 98 do not pass through the spring ring 84. The bolts 98 terminate within the keybar 82, thereby securing the keybar 82 to the spring ring 84. While two bolts 98 are employed in the present embodiment, alternative embodiments may include more or fewer bolts 98. For example, in certain embodiments, 1, 3, 4, 5, 6, or more bolts 98 may be used to secure each keybar 82 to each spring ring 84. This configuration may reduce the cost of frame construction by employing bolted connections between the spring rings 84 and the keybars 82. Furthermore, the spring ring 84 may include second guides or machined axial recesses 97 on a radially inward surface 99 to precisely position each spring ring to keybar connector 88 in the circumferential direction 79. Specifically, each mounting pad 96 may be disposed within each machined recess 97 such that the keybars 82 are circumferentially aligned with the stator notches with sufficient precision to enable the keybars 82 to be machined prior to installation. This configuration may reduce the cost of frame construction compared to welding the keybars 82 to the spring ring 84 prior to machining dovetails.

Figure 5:
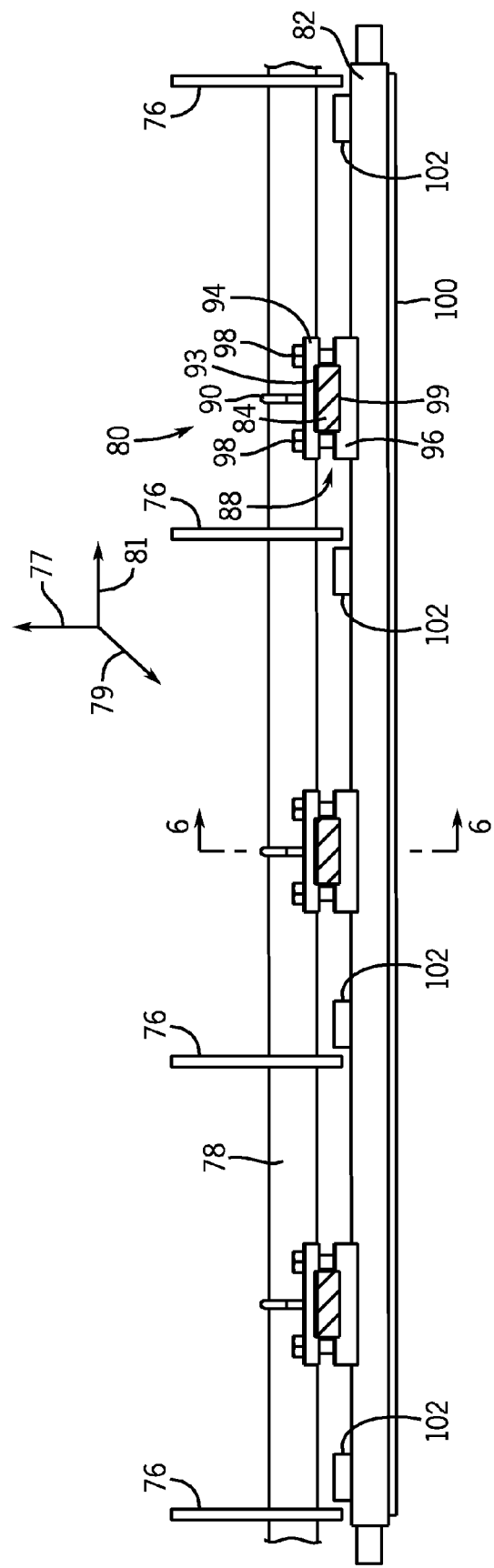
FIG. 5 is a cross-sectional side view of the spring bar, spring ring, and keybar, as shown in FIG. 3, in accordance with certain embodiments of the present technique.

FIG. 5 is a cross-sectional side view of section plates 76, a spring bar 78, a keybar 82, and spring ring assemblies 80. As illustrated, the keybar 82 includes a dovetail 100 configured to interlock with a corresponding notch in the stator 70. Because the keybars 82 are positioned along the circumference of the spring rings 84, coupling between the dovetails 100 and the corresponding notches may secure the stator 70 to the annular frame 66 in both the radial direction 77 and the circumferential direction 79. In addition, multiple compression bands 102 are circumferentially disposed about the keybars 82. The compression bands 102 may facilitate a substantially rigid connection between the keybars 82 and the stator 70 to substantially reduce or prevent "keybar rattle" or movement of the keybars 82 relative to the stator 70. The number of compression bands 102 may vary based on generator configuration. For example, 2, 4, 6, 8, 10, 12, 14, 16, 18, 20, or more compression bands 102 may be employed in certain embodiments. As previously discussed, mounting spring ring assemblies 80 to the spring bar 78 at the approximate midpoint between section plates 76 may enable the spring bar 78 to absorb vibrational energy in both the radial direction 77 and the circumferential direction 79. Furthermore, this configuration may reduce the cost of frame construction by precisely aligning the keybars 82 in the axial direction 81 such that the dovetails 100 align with the stator notches without expensive and time-consuming frame rework.

Figure 6:
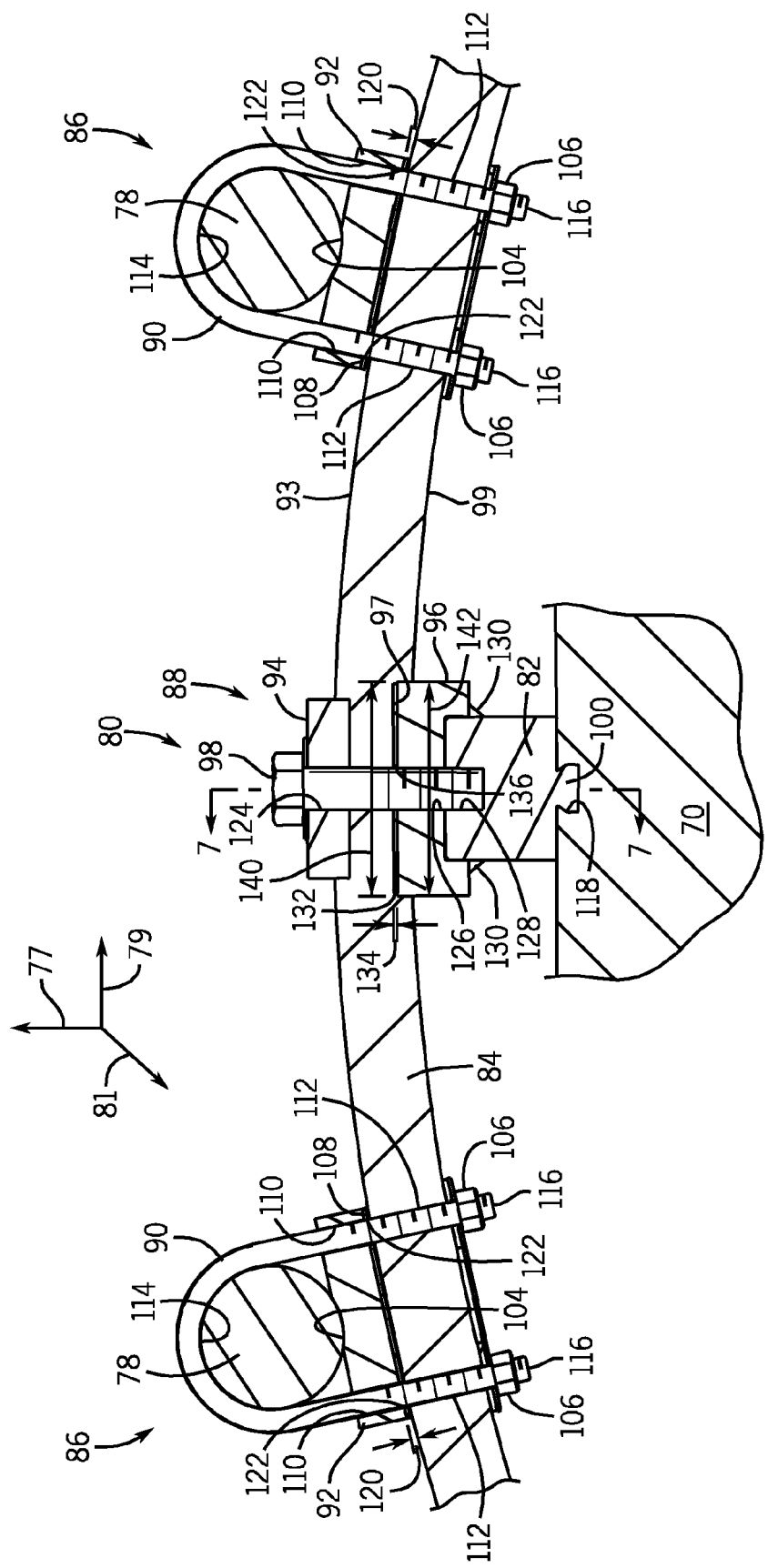
FIG. 6 is a cross-sectional front view of the spring bar, spring ring, and keybar, as taken within line 6-6 of FIG. 5, in accordance with certain embodiments of the present technique.

FIG. 6 is a cross-sectional front view of spring bars 78, a keybar 82, and a spring ring assembly 80, as taken within line 6-6 of FIG. 5. As previously discussed, each spring ring 84 is coupled to each spring bar 78 with a spring ring to spring bar connector 86 including a U-bolt clamp 90 and a clamp plate 92. As illustrated, the clamp plate 92 includes a contoured portion 104 that conforms to the circular cross-section of the spring bar 78. In addition, the connector 86 also includes nuts 106 and a radial shim 108. This configuration may establish a substantially rigid connection between the spring bar 78 and the spring ring 84. Specifically, bolt holes 110 within the clamp plate 92 may be aligned with bolt holes 112 in the spring ring 84. The clamp plate 92 may then be disposed adjacent to the spring bar 78 such that the spring bar 78 contacts the contoured portion 104. A curved portion 114 of the U-bolt clamp 90 may be placed around the spring bar 78 such that straight ends 116 pass through the bolt holes 110 in the clamp plate 92 and the bolt holes 112 in the spring ring 84. Nuts 106 may then be secured to the straight ends 116 of the U-bolt clamp 90, thereby connecting the spring bar 78 to the spring ring 84. By precisely positioning the bolt holes 112, the spring ring 84 may be circumferentially aligned within the annular frame 66 such that the keybar dovetail 100 aligns with a stator notch 118, thereby enabling the dovetail 100 to be machined prior to generator assembly.

A radial position of the spring ring 84 may be adjusted by inserting a shim 108 between the clamp plate 92 and the spring ring 84. For example, due to manufacturing tolerances, certain keybar dovetails 100 may be radially offset from corresponding mating slots or notches 118 in the stator 70. Therefore, shims 108 may be inserted between the clamp plates 92 and the spring rings 84 to compensate for the offset. A thickness 120 of each shim 108 may be particularly selected to properly align each dovetail 100 with each stator notch 118. In certain embodiments, shims 108 may be selected from a set of shims having varying thicknesses 120. For examples, shims 108 may be 5, 10, 15, 20, 30, 40, 50, 60, 70, or more mils thick. Furthermore, multiple shims 108 may be stacked between the clamp plate 92 and the spring ring 84. For example, a 5 mil shim may be combined with a 30 mil shim to establish a 35 mil offset. Each shim 108 may also have bolt holes 122 to accommodate passage of the U-bolt clamp 90 through the shim 108.

FIG. 6 also illustrates the spring ring to keybar connector 88, circumferentially offset from the spring ring to spring bar connector 86. As previously discussed, the connector 88 includes a spring ring clamp plate 94, a mounting pad 96, and bolts 98. As illustrated, the spring ring clamp plate 94 is coupled adjacent to the outer radial surface 93 of the spring ring 84, while the mounting pad 96 is coupled to the inner radial surface 99. Bolts 98 pass through holes 124 in the spring ring clamp plate 94 and holes 126 in the mounting pad 96, and extend within recesses 128 in the keybar 82. This configuration secures the keybar 82 to the spring ring 84 in the radial direction 77. In certain embodiments, the keybar 82 may be secured to the mounting pad 96 by a welded connection 130. For example, prior to coupling the keybar 82 to the spring ring 84, the keybar 82 may be welded to the mounting pad 96 and machined to create the dovetail 100. This arrangement may ensure that the dovetail 100 is properly positioned with respect to the mounting pad 96. Therefore, as discussed in detail below, when the mounting pad 96 is secured to the spring ring 84, the dovetail 100 may be properly aligned with the corresponding stator notch 118.

In addition, a radial shim 132 may be sandwiched between the mounting pad 96 and the spring ring 84. Similar to the shim 108 disposed between the clamp plate 92 and the spring ring 84, the shim 132 may be used to adjust the radial position of the keybar 82 with respect to the stator 70. In certain embodiments, a thickness 134 of the shim 132 may be selected from a set of shims, each having a different thickness 134. For examples, shims 132 may be 5, 10, 15, 20, 30, 40, 50, 60, 70, or more mils thick. Furthermore, multiple shims 132 may be stacked between the mounting pad 96 and the spring ring 84. For example, a 10 mil shim may be combined with a 20 mil shim to establish a 30 mil offset. Because the shims 132 facilitate radial adjustment of the keybars 82, keybar position may be varied during attachment of the stator 70 to the frame 66. Specifically, by adjusting keybar position, the dovetails 100 may be properly aligned within corresponding notches 118 in the stator 70 without additional welding or machining operations that may contaminate the assembly. Each shim 132 may also have bolt holes 136 to accommodate passage of bolts 98 through the shim 132.

The mounting pad 96 and shim 132 (if radial adjustment of the keybar 82 is desired) are disposed within a machined recess 97 in the inner radial surface 99 of spring ring 84. The recess 97 is precisely located along the circumference of the spring ring 84 to properly position the keybar 82 with respect to the stator 70. Specifically, the position of the recess 97 is selected such that the keybar dovetail 100 precisely fits within the corresponding notch 118 in the stator 70. For example, in certain embodiments, the recess 97 is located within approximately 0.015 inches of the desired position. This tolerance may be larger or smaller in alternative embodiments. For example, the tolerance may be less than approximately 0.005, 0.010, 0.020, 0.025, or 0.030 inches. Machining the recesses 97 to such a tolerance may serve to properly locate the keybars 82 with respect to the stator 70 without expensive and time-consuming frame rework. In addition, because the recesses 97 are configured to precisely position the keybars 82, the keybars 82 may be machined prior to spring ring attachment. This process may significantly reduce assembly time and decrease the production costs associated with frame construction.

Furthermore, a width 140 of the recess 97 may also be precisely machined to correspond to a width 142 of the mounting pad 96. For example, the tolerance may be less than approximately 0.005, 0.010, 0.020, 0.025, or 0.030 inches. As appreciated, electromagnetic interaction between the rotating rotor 68 and the stationary stator 70 applies a torque to the stator 70. Coupling between the stator 70 and the spring ring 84 may serve to secure the stator 70 to the annual frame 66. Specifically, torque applied to the stator 70 along the circumferential direction 79 is resisted by the keybar 82. The torque is then transferred to the mounting pad 96 through the welded connection 130, for example. Torque is applied to the spring ring 84 by the mounting pad 96 via contact between the mounting pad 96 and the recess 97. Therefore, precisely machining the recess 97 may serve to limit movement (i.e., reduce vibration) of the mounting pad 96 with respect to the spring bar 84. This configuration may also ensure that the position of the mounting pad 96 remains substantially fixed relative to the spring ring 84 throughout the operational life of the generator 64. Furthermore, precise machining of the recess 97 may limit the shear force on the bolts 98. Specifically, by limiting movement of the mounting pad 96 and keybar 82 with respect to the spring ring 84, the bolts 98 may experience lower shear forces during fault torques (i.e., torques having greater magnitude than normal generator operation). This configuration may enable the bolts 98 to be constructed of thinner and less expensive materials, thereby reducing frame construction costs.

In alternative embodiments, the mounting pad 96 may be omitted. In such a configuration, keybar 82 may be disposed directly within the recess 97 of the spring ring 84. The recess 97 may be machined such that the width of the recess 97 is substantially similar to the width of the keybar 82, thereby limiting movement of the keybar 82 with respect to the spring ring 84. Furthermore, shim 132 width may be adjusted to correspond to the width of the recess 97. This configuration may reduce construction costs by eliminating the mounting pad 96. In addition, because the radial distance between the keybar 82 and the spring ring 84 is reduced, a larger diameter stator 70 may fit within a given frame diameter. However, the keybar 82 may be configured such that the stator 70 does not contact the U-bolt clamps 90 and/or the nuts 106 during generator operation (i.e., as the distance between the stator 70 and the spring ring 84 varies due to spring bar flexing). Specifically, the radial extent of the keybar 82 may be greater than the minimum radial separation distance between the stator 70 and the U-bolt clamps 90 and/or the nuts 106.

Figure 7:
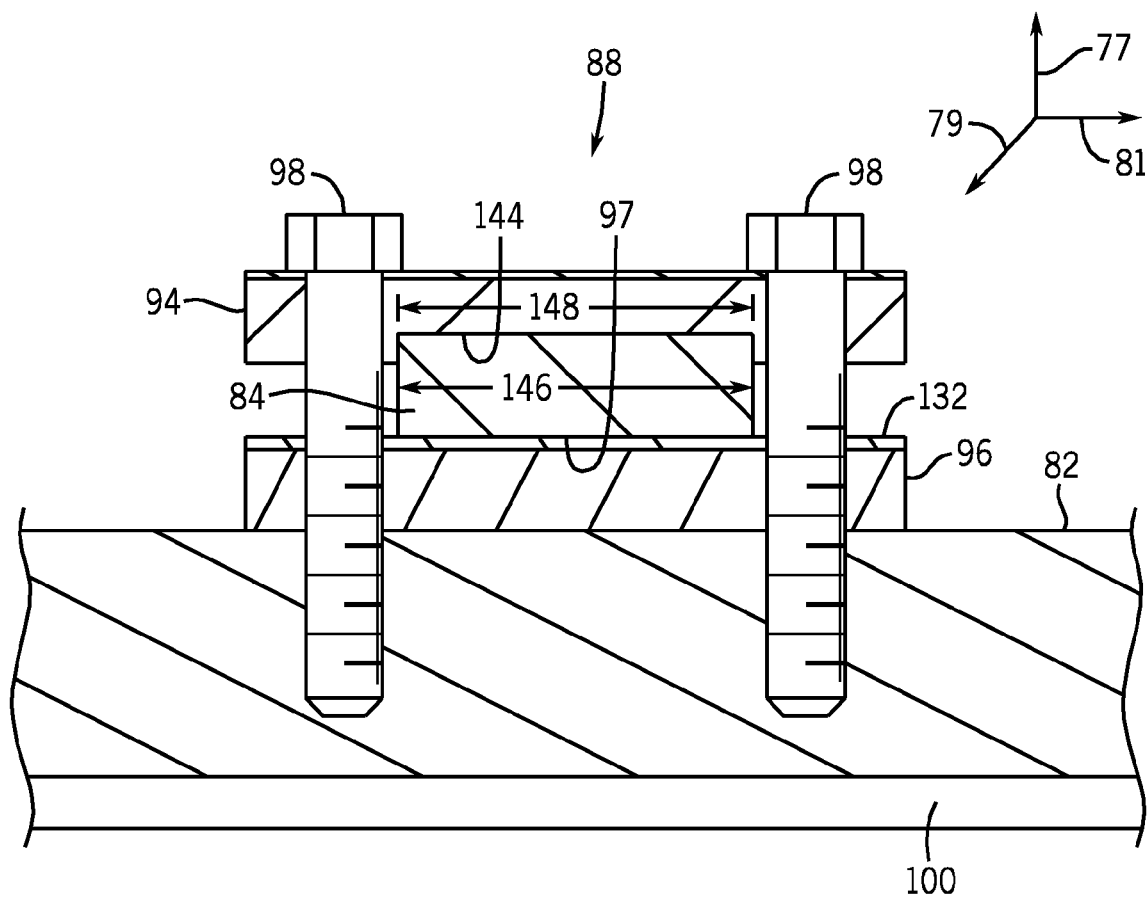
FIG. 7 is a cross-sectional side view of the spring ring and keybar, as taken within line 7-7 of FIG. 6, in accordance with certain embodiments of the present technique.

FIG. 7 is a cross-sectional side view of a spring ring 84, a keybar 82 and the spring ring to keybar connector 88, as taken within line 7-7 of FIG. 6. As previously discussed, the keybar 82 may be secured to the spring ring 84 via a spring ring clamp plate 94, a mounting pad 96 and bolts 98. Specifically, the spring ring 84 is disposed within a circumferential recess 144 of the spring ring clamp plate 94. A width 146 of the spring ring 84 may be substantially similar to a width 148 of the recess 144. This arrangement, in combination with the bolts 98, may serve to resist axial or "rail hump" loads by securing the keybar 82 to the spring ring 84 along the axial direction 81. Furthermore, as illustrated, the shim 132 extends along the entire axial extent of the mounting pad 96. In alternative embodiments, the shim 132 may only extend along the width 146 of the spring ring 84. In further embodiments, the mounting pad 96 may be omitted and the spring ring 84/shim 132 may be disposed directly adjacent to the keybar 82. Either configuration may reduce the construction costs associated with frame assembly by facilitating accurate positioning of the keybars 82 relative to the stator 70 without post-assembly machining or welding operations.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
  a generator, comprising:
    a rotor;
    a stator disposed about the rotor; and
    a framework disposed about the stator, wherein the framework comprises:
      an outer annular support;
      an outer axial bar coupled to the outer annular support;
      an inner axial bar coupled to the stator;
      a spring ring disposed radially between the outer axial bar and the inner axial bar, wherein the spring ring is removably coupled to the outer axial bar via a first guide configured to align the spring ring to the outer annular support, the spring ring is removably coupled to the inner axial bar via a second guide configured to align the inner axial bar with the stator, and the second guide comprises first removable fasteners configured to engage the inner axial bar to removably couple the inner axial bar to the spring ring.

2. The system of claim 1, wherein the first guide comprises a set of radial fastener receptacles configured to receive one or more second removable fasteners to secure the outer axial bar to the spring ring, and the set of radial fastener receptacles is configured to align the spring ring circumferentially relative to the outer annular support.

3. The system of claim 2, comprising one or more radial shims disposed between the outer axial bar and the spring ring, wherein the one or more radial shims are configured to align the spring ring radially relative to the outer annular support.

4. The system of claim 2, wherein the one or more second removable fasteners comprise a U-bolt clamp disposed about the outer axial bar, and the set of radial fastener receptacles comprises a pair of radial openings to receive opposite ends of the U-bolt clamp.

5. The system of claim 1, wherein the second guide comprises an axial recess along an inner surface of the spring ring, and the axial recess is configured to align the inner axial bar circumferentially relative to the stator.

6. The system of claim 5, comprising one or more radial shims disposed between the inner axial bar and the spring ring, wherein the one or more radial shims are configured to align the inner axial bar radially relative to the stator.

7. The system of claim 6, wherein the inner axial bar comprises a dovetail disposed in a mating slot in the stator, the second guide circumferentially aligns the dovetail with the mating slot, and the one or more radial shims radially align the dovetail with the mating slot.

8. The system of claim 5, comprising a clamp plate comprising a circumferential recess disposed about an outer surface of the spring ring, wherein the clamp plate comprises opposite axial ends extending beyond the spring ring, the opposite axial ends comprise radial fastener receptacles, and the first removable fasteners extend radially through the radial fastener receptacles to secure the spring ring to the inner axial bar.

9. The system of claim 8, wherein the first removable fasteners do not extend through the spring ring.

10. The system of claim 1, wherein the outer annular support comprises a ring-shaped plate, the outer axial bar extends through an axial opening in the ring-shaped plate, and the outer axial bar is circumferentially offset from the inner axial bar.

11. The system of claim 1, comprising a drive coupled to the generator, wherein the framework comprises a plurality of the outer annular support axially spaced from one another along a rotational axis of the generator, a plurality of the outer axial bar circumferentially spaced about the rotational axis, a plurality of the inner axial bar circumferentially spaced about the rotational axis, and a plurality of the spring ring axially spaced from one another along the rotational axis.

12. A system, comprising:
  a generator framework, comprising:
    an outer annular support;
    a spring ring configured to mount removably between the outer annular support and a stator, wherein the spring ring comprises a first guide configured to circumferentially align the spring ring to the outer annular support, and a second guide configured to circumferentially align the spring ring to the stator;
    a first axial bar configured to mount removably between the spring ring and the outer annular support, wherein the first guide circumferentially aligns the spring ring with the outer annular support; and
    a first removable clamp configured to mount the first axial bar along an exterior of the spring ring.

13. The system of claim 12, wherein the first guide is circumferentially offset from the second guide.

14. The system of claim 12, comprising a first set of shims configured to radially align the spring ring to the outer annular support, and a second set of shims configured to radially align the spring ring to the stator.

15. The system of claim 12, comprising a second axial bar configured to mount removably between the spring ring and the stator, wherein the second guide circumferentially aligns the second axial bar with the stator.

16. The system of claim 15, comprising a second removable clamp configured to mount the second axial bar along an interior of the spring ring.

17. A system, comprising:
a rotary machine, comprising:
an annular frame;
a stator disposed within the annular frame;
a rotor disposed radially inward from the stator and configured to rotate about a longitudinal axis of the annular frame;
a stator mounting system, comprising:
a plurality of circumferentially spaced spring bars extending axially through the annular frame and secured to the annular frame;
a plurality of annular spring rings disposed within the annular frame and secured to the plurality of spring bars by a plurality of U-bolt clamps; and
a plurality of keybars disposed adjacent to machined recesses within the plurality of annular spring rings, wherein the machined recesses are configured to secure the plurality of keybars in a circumferential direction.

18. The system of claim 17, comprising at least one radial adjustment shim disposed adjacent to an inner radial surface of at least one machined recess between at least one annular spring ring and at least one keybar.

19. The system of claim 17, comprising at least one spring ring shim disposed between at least one annular spring ring and at least one spring bar.

20. The system of claim 17, comprising a plurality of mounting pads secured to the plurality of keybars and disposed within the machined recesses to secure the plurality of keybars in the circumferential direction.

* * * * *